(12) United States Patent
Kuzkin et al.

(10) Patent No.: US 11,019,168 B2
(45) Date of Patent: May 25, 2021

(54) SYSTEM AND METHOD FOR INTEGRATING CLOUD APPLICATIONS INTO A CLOUD SERVICE BROKER PLATFORM USING AN AUTOMATED, UNIVERSAL CONNECTOR PACKAGE

(71) Applicant: Ingram Micro Inc., Irvine, CA (US)

(72) Inventors: Maxim Kuzkin, Irvine, CA (US); Taylor Michael Giddens, Sofia (BG); David Wippich, Irvine, CA (US); Aleksandr Khaerov, Moscow (RU); Dmitrii Fontanov, Moscow (RU)

(73) Assignee: INGRAM MICRO INC., Irvine, CA (US)

( * ) Notice: Subject to any disclaimer, the term of this patent is extended or adjusted under 35 U.S.C. 154(b) by 0 days.

(21) Appl. No.: 16/175,502

(22) Filed: Oct. 30, 2018

(65) Prior Publication Data

US 2019/0132410 A1 May 2, 2019

Related U.S. Application Data

(60) Provisional application No. 62/578,992, filed on Oct. 30, 2017.

(51) Int. Cl.
*H04L 29/08* (2006.01)
*G06F 21/44* (2013.01)
(Continued)

(52) U.S. Cl.
CPC .......... *H04L 67/2838* (2013.01); *G06F 21/10* (2013.01); *G06F 21/44* (2013.01);
(Continued)

(58) Field of Classification Search
CPC .. H04L 67/2838; H04L 67/28; H04L 41/5064
See application file for complete search history.

(56) References Cited

U.S. PATENT DOCUMENTS 7,633,955 B1 * 12/2009 Saraiya ................ H04L 49/356
370/395.31
10,129,211 B2 * 11/2018 Heath .................... G06Q 10/10
(Continued)

*Primary Examiner* — Dhairya A Patel
(74) *Attorney, Agent, or Firm* — Ice Miller LLP

(57) ABSTRACT

A method for integrating cloud applications into a cloud service broker (CSB) platform using an automated, universal connector, the method includes receiving at a connector hub, a connector package for a software from an independent software vendor device, creating a connector instance for the connector package for integration with the CSB platform, the CSB platform further configured to provide licenses for the software, receiving at the cloud service broker computing device via a CSB platform interface, a subscription request for the software, the subscription request comprising an activity selected from a group consisting of a creation, change and deletion, transmitting to a universal connector device by a CSB platform controller, the subscription request, processing, at the universal connector device, the subscription request, notifying a customer relationship management (CRM) device, by the universal connector device, of the subscription request, storing the subscription request in a CRM database, obtaining approval by the universal connector device, for the subscription request, processing, at the universal connector device, the subscription request, upon receiving a request approval, and transmitting a subscription approval result to the CSB platform, the CSB platform displaying subscription approval result to a subscribe.

20 Claims, 13 Drawing Sheets

(51) Int. Cl.
*H04L 12/24* (2006.01)
*G06F 21/10* (2013.01)

(52) U.S. Cl.
CPC ...... *H04L 41/5064* (2013.01); *H04L 67/2809* (2013.01); *H04L 67/2823* (2013.01); *H04L 67/32* (2013.01); *H04L 67/34* (2013.01)

(56) References Cited

U.S. PATENT DOCUMENTS

| | | | | |
|---|---|---|---|---|
| 10,942,719 | B2* | 3/2021 | Dubinskii | G06F 8/60 |
| 2012/0147894 | A1* | 6/2012 | Mulligan | H04L 41/5048 |
| | | | | 370/395.53 |
| 2013/0066940 | A1* | 3/2013 | Shao | H04L 67/1025 |
| | | | | 709/201 |
| 2013/0282565 | A1* | 10/2013 | Barta | G06Q 20/38 |
| | | | | 705/39 |
| 2014/0237563 | A1* | 8/2014 | Zhang | H04L 63/083 |
| | | | | 726/5 |
| 2015/0188927 | A1* | 7/2015 | Santhi | H04L 63/104 |
| | | | | 726/4 |
| 2015/0365301 | A1* | 12/2015 | Chatterjee | H04L 47/808 |
| | | | | 709/226 |
| 2016/0260157 | A1* | 9/2016 | Krook | G06Q 30/0635 |
| 2018/0097706 | A1* | 4/2018 | Gupte | H04L 67/10 |
| 2018/0267796 | A1* | 9/2018 | Kennedy | G06F 8/71 |
| 2018/0367632 | A1* | 12/2018 | Oh | H04L 67/2809 |

* cited by examiner

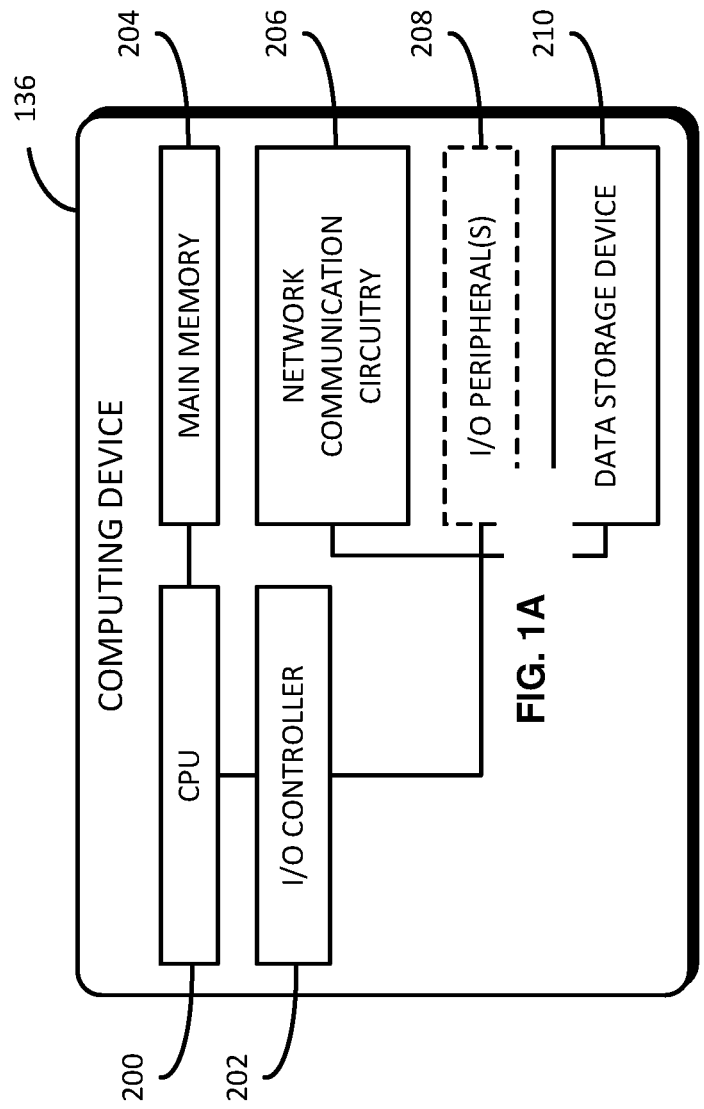

SYSTEM AND METHOD FOR INTEGRATING CLOUD APPLICATIONS INTO A CLOUD SERVICE BROKER PLATFORM USING AN AUTOMATED, UNIVERSAL CONNECTOR PACKAGE

CROSS REFERENCE TO RELATED APPLICATION

The present application is a nonprovisional patent application, which claims the priority benefit of U.S. Application Ser. No. 62/578,992, filed Oct. 30, 2017, the text and drawings of which are hereby incorporated in its entirety.

TECHNICAL FIELD OF THE DISCLOSED EMBODIMENTS

The presently disclosed embodiments generally relate to cloud service brokering, and more particularly, to a system and method for integrating cloud applications into a cloud service broker platform using an automated, universal connector.

BACKGROUND OF THE DISCLOSED EMBODIMENTS

Independent software vendors (ISVs) develop and sell software applications which are typically designed to run on one or more computer hardware or operating system platforms. Such software applications range from basic utility or productivity enhancing application to business process application for enterprises (e.g., customer relationship management (CRM), enterprise resource planning (ERP), automation tools, etc.). As cloud computing has become more pervasive, one such method of delivering software has been via the cloud using software as a service (SaaS) based model. Using this delivery method, the ISVs may sell their software applications, or subscriptions to their software applications, through a public cloud or cloud marketplace, or through a cloud service broker (CSB).

While the cloud marketplace provides an online storefront for customer access to cloud-based services and software applications, a cloud service broker may be used to facilitate the transaction between the ISV and an end user, reseller, retailer, etc., such as by using a plug-in or connector for each cloud application. In traditional cloud service broker implementations, the ISV usually prepares special integration components: connector packages (such metadata, control method descriptions, and content files, which are used to declare and define the application resources, services, user interface components, and logic of control methods necessary for managing cloud application resources); and a connector back-end for translating application programming interface (API) calls with control methods received from the CSB to API calls specific to the particular ISV cloud application(s).

However, many ISV applications do not have fully-automated API services. Therefore, integration with the CSB platform becomes problematic. For example, ISVs have to develop an API and then integration components. In such situations, development of the connector to the CSB platform is time consuming and accounts for a significant portion of the total integration time. Furthermore, testing and validating the connector adds additional time to the integration process. Therefore, there is a need for a system and method for integrating cloud applications into a cloud service broker platform using an automated, universal connector.

SUMMARY OF THE DISCLOSED EMBODIMENTS

In one aspect, a method for integrating cloud applications into a cloud service broker (CSB) platform using an automated, universal connector is provided. The method includes receiving at a connector hub, a connector package for software from an independent software vendor device, creating a connector instance for the connector package for integration with the CSB platform, the CSB platform further configured to provide licenses for the software.

In some embodiments, the method further includes the steps of receiving at the cloud service broker computing device via a CSB platform interface, a subscription request for the software, the subscription request comprising an activity selected from a group consisting of a creation, change and deletion, transmitting to a universal connector device by a CSB platform controller, the subscription request, and processing, at the universal connector device, the subscription request.

In some embodiments, the method further includes the steps of notifying a customer relationship management (CRM) device, by the universal connector device, of the subscription request, storing the subscription request in a CRM database, obtaining approval by the universal connector device, for the subscription request, and processing, at the universal connector device, the subscription request, upon receiving a request approval.

In some embodiments, transmitting a subscription approval result to the CSB platform includes the CSB platform displaying subscription approval result to a subscriber. The method further includes the connector package is developed on a developer portal, the developer portal being accessible by the independent software vendor device.

In some embodiments, the subscription request further includes a correspondent resource model defined in the connector package.

In some embodiments, the subscription request is received by a connector application controller, the step of processing the subscription request at a resource model interpreter, and processing further comprises the step of processing request data with an application programming interface (API) translation engine.

In some embodiments, the method further includes processing, at the universal connector device, parsing counters and limits of the resource model of the correspondent connector package.

In some embodiments, the method further includes processing, at the universal connector device the parsing counters and limits of the resource model of the correspondent connector package, and further comprises the step of processing counters and limits with an application programming interface (API) translation engine.

In some embodiments, translation comprises the step of transforming CSB platform requests into a format operable by the CRM device, and further displaying the requests in a CRM user interface (UI).

In some embodiments, the method further includes the steps of the universal connector transmitting a pending request to the CRM device, and polling an operator response from the a CRM API device; receiving and transforming installation instructions for subscription activation/change received from the CRM API server into format displayable by CSB platform UI; transforming account modifications received from a CRM API server into format displayable by a CSB platform UI; and storing account modifications in a subscription database operably connected to the universal connector device.

In some embodiments, the method further includes parsing and matching a subscription unique identifier associated with an ISV subscription management system, the subscription unique identifier associated with a CSB platform subscription management system; the universal connector providing a response, the response selected from a group consisting of a creation, modification, and deletion; and storing data associated with the subscription request and response in a database of a region that fulfills requirements of the country where the CSB platform is operating.

In some embodiments, an audit module operably connected with the CRM device records operator actions in the CRM database, wherein audit data is used for analyzing technical problems with the integration components; and wherein the CRM device further comprises a security module for authentication of universal connectors.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 2 is a block diagram of an illustrative embodiment of one of the computing devices of the cloud service brokerage system of FIG. 1;

DETAILED DESCRIPTION OF THE DISCLOSED EMBODIMENTS

Figure 1A:
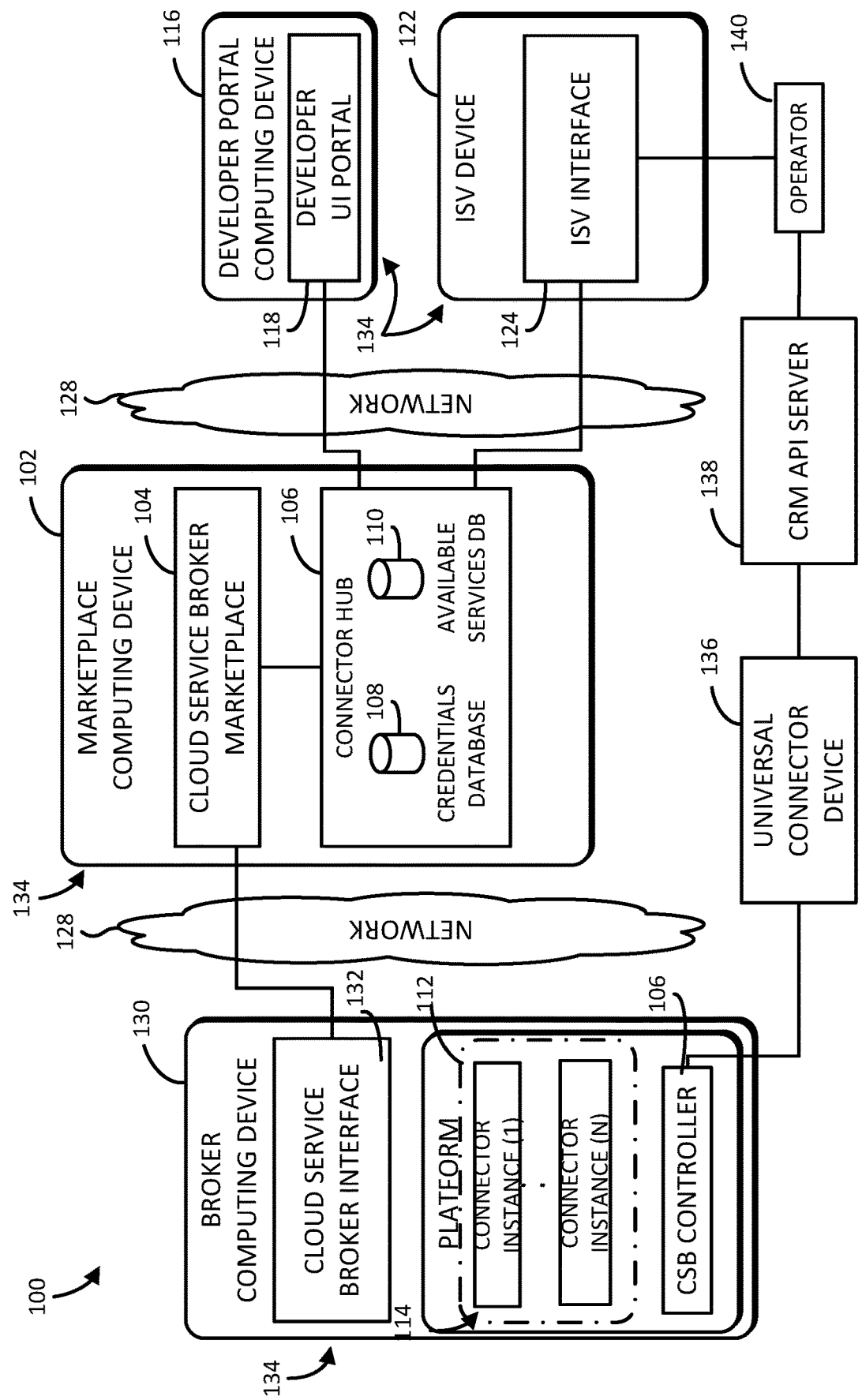
FIG. 1A is a block diagram of an illustrative embodiment of a cloud service marketplace and brokerage system for cloud application distribution via cloud service brokerage systems.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1B:
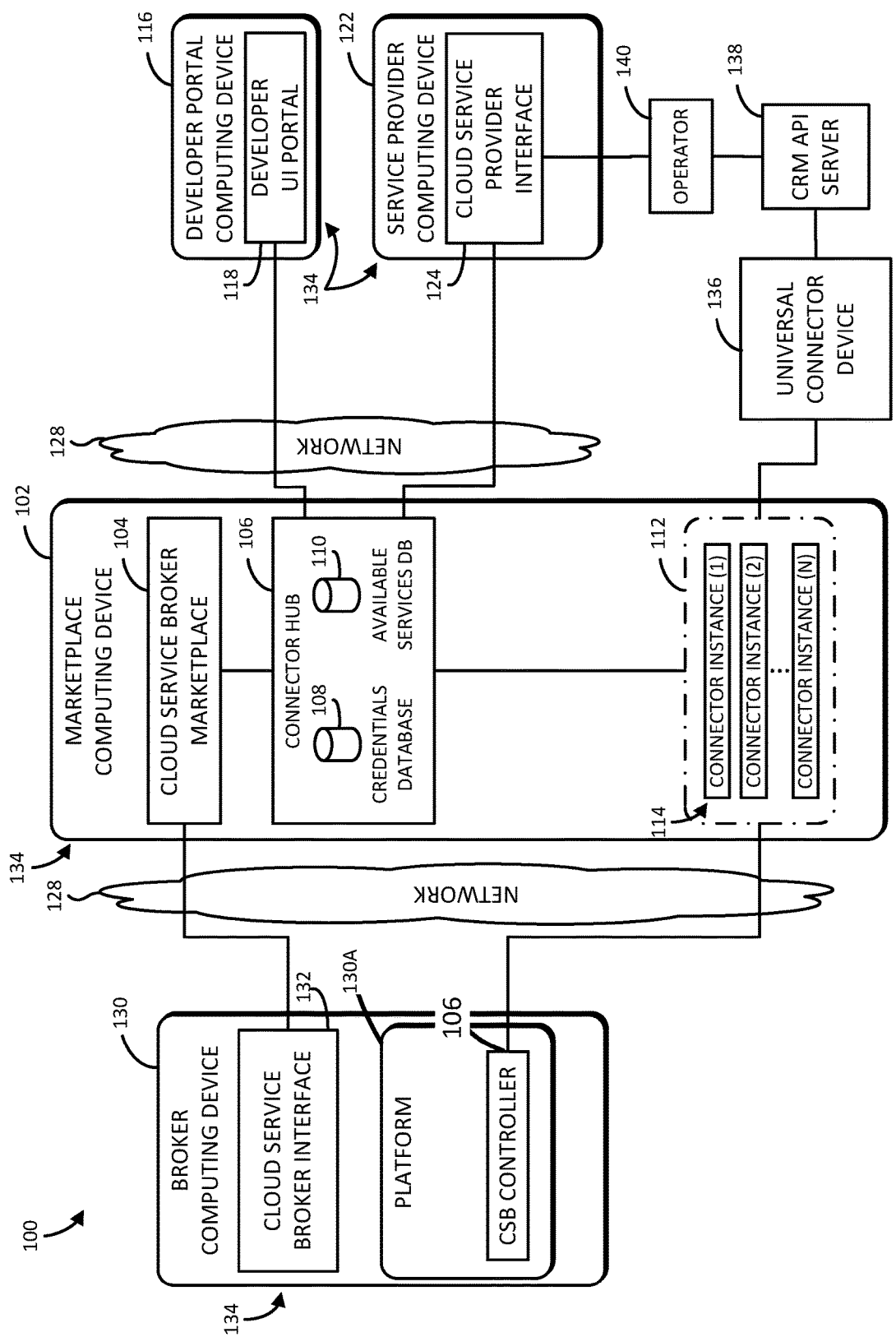
FIG. 1B is a block diagram of another illustrative embodiment of a cloud service marketplace and brokerage system for cloud application distribution via cloud service brokerage systems.
Figure 1C:
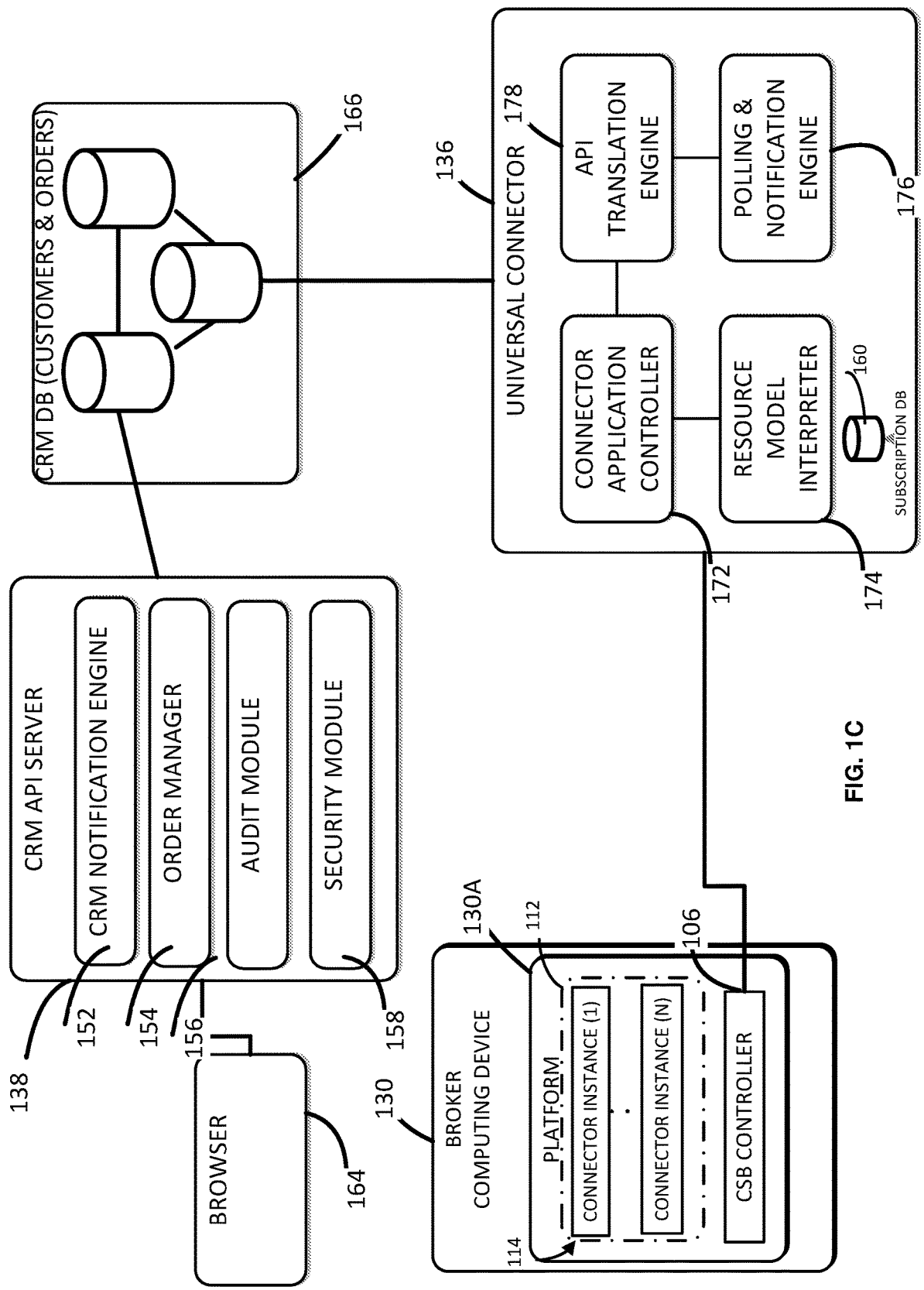
FIG. 1C is a block diagram of an illustrative embodiment of a system for integrating cloud applications into a cloud service broker platform using an automated, universal connector.

FIG. 1 illustrates a cloud service marketplace and brokering system 100 for creating and distributing integration connectors. The cloud service marketplace and brokering system 100 includes a developer portal computing device 116, an ISV computing device 122, and a broker computing device 130, each of which are communicatively coupled to a marketplace computing device 102 (e.g., via a network 128), CRM API server 138 and an universal connector computing device 136. In one embodiment of the present disclosure, a cloud application developer/programmer associated with an ISV may develop connector packages for integrating the ISV's cloud application into the cloud service brokerage system 100.

To develop the connector package, the developer uses a developer portal (e.g., the developer user interface (UI) portal 118 of the developer portal computing device 116) for a particular service to be offered for sale in a cloud service marketplace (e.g., via the cloud service broker marketplace 104 of the marketplace computing device 102). It should be appreciated that the developer may access the developer UI portal 118 via an endpoint computing device (not shown) communicatively coupled (e.g., via the network 128) to the developer portal computing device 116.

In at least one embodiment of the present disclosure, the connector package usually has the form of an archive file that typically includes metadata, control method descriptions, and content files, which are usable to declare and define the application resources, services, user interface components, and logic of control methods necessary for managing cloud application resources. It will be appreciated that a connector package consists of the declarative files used to define the ISV's application attributes and of the "connector frontend"—the web-interface that cloud service broker customers see in the cloud service broker interface. This web-interface is developed by the connector package developers using special framework, which includes widgets, predefined page structure, navigation methods and screen insertion mechanism. A typical connector frontend consists of screens inserted into predefined views, custom logic for rendering widgets and custom navigation structure. The widgets may display information that connector developer considers to be valuable for the customer of the corresponding cloud application, e.g. usage reporting, subscription and service information, instructions and so on.

Using the instructions that the cloud service broker marketplace provides, the connector package can be converted into the connector application, in other word, instance of that connector (see, e.g., a corresponding connector instance 114 of the connector factory 112 of FIG. 1 and FIG. 1A), which is usable to communicate with the coupled universal connector.

The developer portal is configured to receive input from the developer that is usable to define the major components of the connector package, such as a model (e.g., an explanation of the business model for application objects), a user interface(s) supporting user interactions, and a backend (e.g., a representational state transfer (REST) service for process provisioning, management, request monitoring, etc.) for the connector. It should be appreciated that the developer portal may be configured to receive additional information associated with the connector, such as cloud service address, default settings, pricing information, sales templates, an identifier of the cloud service, etc.

The developer portal is additionally configured to, as will be described in further detail below, produce a connector package, test the produced connector package, and publish the tested connector package to a connectors catalogue (e.g., the available services database 110 of the connector hub 106 of the marketplace computing device 102). Subsequent to the development phase, the connector package may then proceed to the production phase, in which the connector can be deployed to a cloud service broker (e.g., by way of the cloud service broker marketplace 104 via the cloud service broker interface 132 of the broker computing device 130).

The broker computing device 130 is configured to manage licenses to various cloud applications between cloud service broker and customers, such as, for example, resellers, cloud application end-users, and the like. In an illustrative example, an ISV (e.g. a cloud service provider) contracts with a controlling entity of the cloud service marketplace 102 to facilitate the sale of a license to an end-user by providing connector package that allows cloud service broker marketplace customers (e.g. cloud service brokers) to upload the connector package and integrating the process of managing this cloud application into cloud service broker platform. The license may then allow that end-user, or other end-user(s) associated therewith, certain access to the ISV's cloud services (e.g., cloud-based software as a service (SaaS) application(s)).

To do so, the illustrative marketplace computing device 102 includes a connector hub 106 that is configured to store packaged connectors generated via the developers UI portal 118 (e.g., in the available services database 110) and to establish provisioning channels for connectors 114 of a connector factory 112 between a ISV interface 124 of the ISV computing device 122 and a cloud service broker interface 132 of the broker computing device 130. Accordingly, a cloud service broker may then sell licenses for cloud applications associated with the packaged connectors to end-users (e.g., a customer, a broker, a re-seller, etc.) via their respective cloud service broker interface 132.

The connector hub 106 is additionally configured to generate provisioning channel credentials for each cloud service broker 130 (e.g., broker credentials and/or cloud ISV credentials and/or universal connector credentials and/or CRM API server 138 credentials, such as may be stored in the credentials database 108). It should be appreciated that the provisioning channel credentials may be any type of information (e.g., cryptographic keys or other arbitrary data) that is usable to authenticate a secure communication channel between two entities using the provisioning channel credentials.

In at least one embodiment of the present disclosure, the provisioning channel can be set up by the cloud service broker marketplace. The provisioning channel connects from universal connector 136 and CRM API server 138 from which. ISV's operator can receive orders, which includes activities such as, for example, creation of a new subscription, deletion of an existing subscription, modifying an existing subscription, providing activation instructions for the customer, viewing and changing geographically-distributed customers' personal data.

It will be appreciated that the purpose of the universal connector 136 is to translate the cloud service broker's platform's API to the CRM API server 136's API. It will be further appreciated that the universal connector 136 is capable of processing any resource model of any connector package of any cloud application it receives from the cloud service broker and it can convert it to the format applicable to the CRM API server 136. Universal connector 136 transforms the lifecycle flow of the ISV's application in the CSB platform into entities in the CRM API server 136, and by operator's reaction to these entities it can provide to the CSB platform the needed information about the application's current state. It will be appreciated that such a provisioning channel allows for the automation of cloud application provisioning for ISVs that do not have API or any other integration instrument.

As shown in the illustrative cloud service marketplace and brokering system 100, each of the marketplace computing device 102, the developer portal computing device 116, the ISV computing device 122, the broker computing device 130, universal connector 136 computing device, CRM API server 136 are embodied as computing devices 134. Accordingly, it should be appreciated that each of the respective computing devices 134 may be embodied as any type of compute and/or storage device capable of performing the functions described herein. Additionally, it should be further appreciated that each of the respective computing devices 134 may be comprised of more than one computing device 134. For example, one or more of the computing devices 134 may be embodied as one or more servers (e.g., stand-alone, rack-mounted, etc.) and/or combination of compute blades and data storage devices (e.g., of a storage area network (SAN)) in a cloud architected network or data center, while one or more of the other computing devices 134 may be embodied as one or more desktop computers, mobile computing devices (e.g., smartphones, wearables, tablets, laptops, notebooks, etc.), or any other type of "smart" or otherwise Internet-connected devices.

FIG. 1A is another embodiment of a cloud service marketplace and brokerage system for cloud application distribution via cloud service brokerage systems. The only one difference is that cloud service broker marketplace set connector instances for cloud service brokers on his own premises. According to this embodiment all the data about account, resource model and other data collected by the cloud service broker platform interface and need to be translated to ISV for the managing of cloud application subscription are translated by the cloud service broker controller via the correspondent connector instance to the universal connector. In that case, the connector hub 106 generates pair of secret keys between the cloud service broker and every connector instance deployed by the cloud service broker request.

In at least one embodiment of the present disclosure, a block diagram of an illustrative embodiment of a system for translating the lifecycle flow of the ISV's application in the CSB Platform to the ISV using an automated, universal connector, is shown in FIG. 1B. The system 140 further includes a CRM API server 138, a broker computing device 130, a browser 164, a CRM database 166, and a universal connector 136.

In at least one embodiment of the present disclosure, the CRM API server 138 includes a CRM notification engine 152, an order manger 153, an audit module 156, and a security module 158. In at least one embodiment of the present disclosure, the broker computing device 130 includes a platform 130A that includes at least one of a plurality of connector instances 112 and cloud service broker controller 106. The cloud service broker controller 106 of the platform 130A is configured to transmit requests and all needed data of cloud service subscription creation (provisioning), deletion and change to the universal connector.

In at least one embodiment of the present disclosure, the universal connector 136 is configured to handle every model configuration and transform incoming subscription requests into CRM orders. The universal connector 136 further includes a connector application controller 172, a resource model interpreter 174, a polling and notification engine 176, and an API translation engine 178. In at least one embodiment of the present disclosure, the universal connector 136 is configured to receive from a cloud service broker controller 106 the resource model of the correspondent connector package associated with the at least one connector instance 114 which refers to the cloud service which subscription that is being created, modified or deleted. In at least one embodiment of the present disclosure, the resource model interpreter 174 is configured to parse this resource model and identify counters (e.g. disk space, virtual machines, mailboxes etc.) and limits (2 mailboxes, 1 GB of disk space etc.) of resources included in the subscription that is being processed and retrieve the identified counters and limits to the connector application controller 172.

In at least one embodiment of the present disclosure the connector application controller 172 is configured to receive data about processed subscription (e.g. name of the associated cloud application, resources etc.) identified counters and limits of resources and transmit this data to an API translation engine 178.

In at least one embodiment of the present disclosure the API translation engine 178 is configured to process received data and convert it to the format that CRM system can understand and mirror them as orders. It will be appreciated that the API translation engine 178 process data in the manner that an operator using CRM system can then easily identify what kind of actions (in response on orders) and with which one cloud application and resources and services provided by this cloud application are required.

Polling and notification engine 176 notifies CRM API server 138 about new orders and in return receives data about status of this orders.

CRM API server 138 stores the orders and information about customers of the processed subscriptions in its database 166. In at least one embodiment of the present disclosure, the CRM API server 138 includes an audit module 156 that is configured to store all modifications in orders made by operator (chanced account data in comparison with account data received from the universal connector, changes in subscription (mistakes in counters, limits etc.) etc.). Security module 158 authenticates any universal connectors (e.g. universal connector device 136). CRM notification engine 152 displays notifications about orders to an operator.

In at least on embodiment of the present disclosure, the system 140 includes a CRM database 166. The CRM database 166 is configured to process orders and customer information as received from universal connector 136, wherein the parameters include information about geography of a cloud service broker. By way of example, if cloud service broker is located in Europe, the information about orders initiated by such cloud service broker is stored in database located in Europe, where such requirement may be driven by legal and/or regulatory requirements. It will be appreciated that the CRM database 166 may be a single database, a distributed database, or an alternative database arrangement, configured to perform as disclosed herein.

In at least one embodiment of the present disclosure, the browser 164 may be deployed on an operator side, wherein the browser 164 is used for operably communicating with the CRM API server 138 (e.g. via network 128), such that the operator can perform administrative functions on the ISV native subscription creation system in response to the orders such as, for example, creating subscriptions, updating/deleting subscriptions, and the like.

Referring now to FIG. 2, an illustrative embodiment of a computing device 134 representative of one or more of the marketplace computing device 102, the developer portal computing device 116, the ISV computing device 122, and the broker computing device 130 is shown. The illustrative computing device 134 includes a central processing unit (CPU) 200, an input/output (I/O) controller 202, a memory 204, a network communication circuitry 206, and a data storage device 210, as well as, in some embodiments, one or more I/O peripherals 208. In some embodiments, one or more of the illustrative components may be combined on a single system-on-a-chip (SoC) on a single integrated circuit (IC). It should be appreciated that alternative embodiments may include additional, fewer, and/or alternative components to those of the illustrative computing device 134, such as a graphics processing unit (GPU), a power supply, etc., which are not shown to preserve clarity of the description. It should be further appreciated that the type of storage/compute components of the respective computing device 134 may be predicated upon the type and intended use of the respective computing device 134.

The CPU 200, or processor, may be embodied as any type of hardware or combination of circuitry capable of processing data. Accordingly, the CPU 200 may include one processing core (not shown) in a single-core processor architecture, or multiple processing cores in a multi-core processor architecture. Irrespective of the number of processing cores, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 134. Illustratively, the I/O controller 202 is configured to receive input/output requests from the CPU 200, and send control signals to the respective input/output devices, thereby managing the data flow to/from the computing device 134.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 134 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 134 to a computer network (e.g., the network 128), as well as other computing devices of the cloud service marketplace and brokering system 100.

The one or more I/O peripherals 208 may be embodied as any auxiliary device configured to connect to and communicate with the computing device 134. For example, the I/O peripherals 208 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output).

In some embodiments, the I/O peripherals 208 may be connected to the computing device 134 via a cable (e.g., a ribbon cable, a wire, a universal serial bus (USB) cable, a high-definition multimedia interface (HDMI) cable, etc.) of the computing device 134. In such embodiments, the cable is connected to a corresponding port (not shown) of the computing device 134 for which the communications made there between can be managed by the I/O controller 202. In alternative embodiments, the I/O peripherals 208 may be connected to the computing device 134 via a wireless mode of communication (e.g., Bluetooth®, Wi-Fi®, etc.) which can be managed by the network communication circuitry 206.

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary or secondary storage, and are typically used to store a large amount of data relative to the memory 204 described above.

Referring back to FIG. 1, the illustrative cloud service marketplace system 100 includes a network 128 that is usable for the other computing devices 134 (i.e., the developer portal computing device 116, the ISV computing device 122, and the broker computing device 130) to communicate with the marketplace computing device 102. The network 128 may be implemented as any type of wired and/or wireless network, including a local area network (LAN), a wide area network (WAN), a metropolitan area network (MAN), a global network (the Internet), etc., utilizing any wired and/or wireless communication technologies and network communication transmission protocols. Accordingly, the network 128 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

For example, one or more of such network computing devices may be configured to couple one or more of the marketing computing device 102, the developer portal computing device 116, the ISV computing device 122, and/or the broker computing device 130 to the network 128 in a LAN configuration using wired (e.g., Ethernet, token ring, etc.) and/or a WLAN configuration using wireless (e.g., Bluetooth®, Wi-Fi®, wireless broadband, ZigBee®, etc.) communication technologies and associated protocols. In furtherance of the example, a LAN configuration may be coupled (e.g., via coaxial, mobile telephony, fiber, etc.) to one or more larger area networks (e.g., WANs, metropolitan area networks (MANs), the Internet, etc.) via additional network computing devices of the network 128. It should be appreciated that one or more of the network computing devices and/or network configurations may be virtualized (e.g., a virtual switch, a virtual LAN, etc.).

As described previously, the developer portal computing device 116 includes a developer UI portal, the ISV computing device 122 includes a cloud ISV interface 124, and the illustrative broker computing device 130 includes a cloud service broker interface 132. Each of the developer UI portal 118, the cloud ISV interface 124, and the cloud service broker interface 132 may be embodied as any combination of software, hardware, firmware, and circuitry capable of performing the functions described herein. In some embodiments, one or more of the developer UI portal 118, the cloud ISV interface 124, and the cloud service broker interface 132 may be configured to render information (e.g., via a graphical UI, command line interface, etc.) to a display of their respective computing device 134. In such embodiments, the developer UI portal 118, the cloud ISV interface 124, and/or the cloud service broker interface 132 may be configured to relay inputs received from a user to login, configure the respective interface, or manipulate information (e.g., settings) associated therewith.

Figure 3:
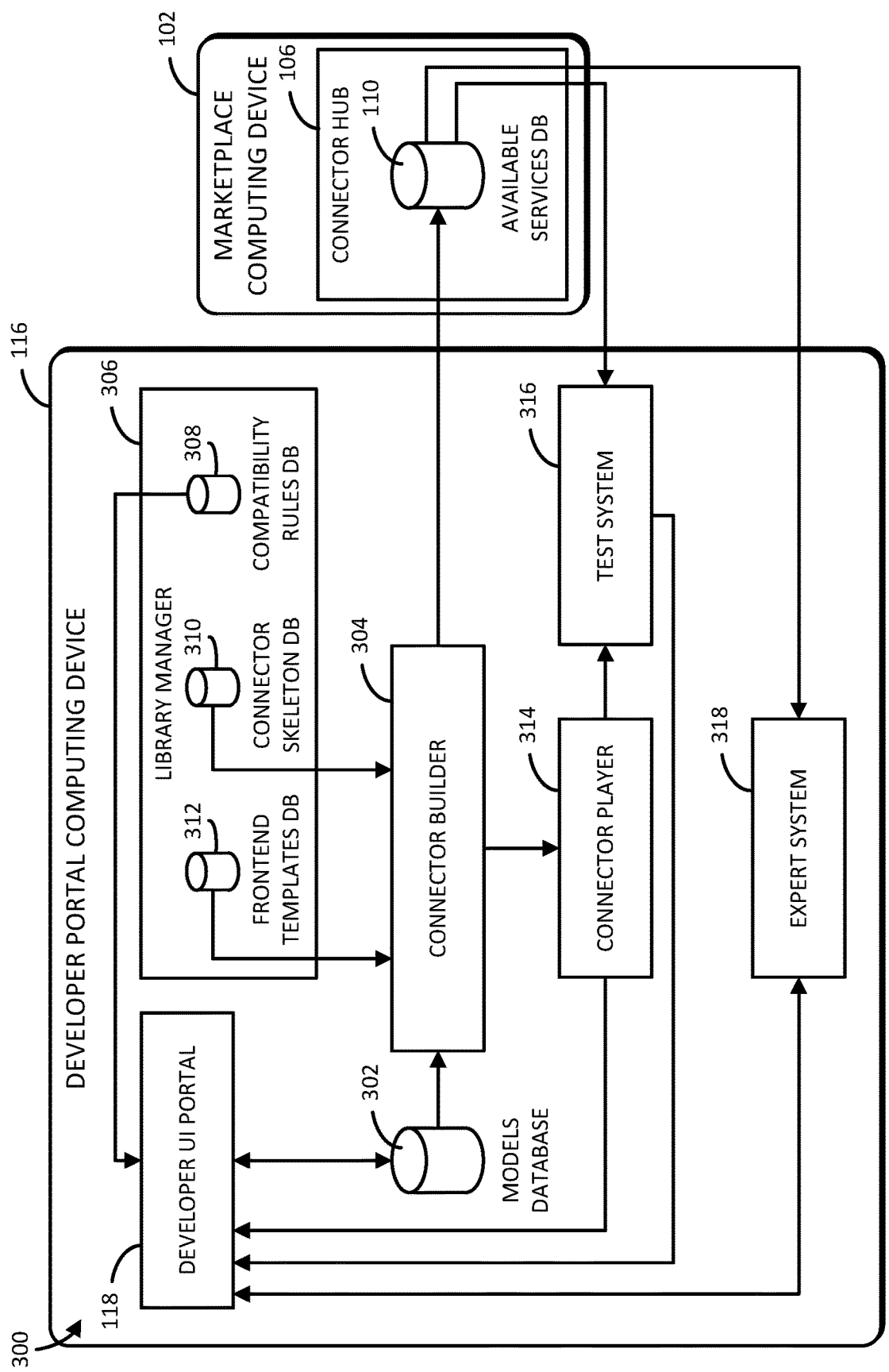
FIG. 3 is a block diagram of an illustrative environment of the developer portal computing device of FIG. 1.

Referring now to FIG. 3, an illustrative environment 300 of the developer portal computing device 116 is shown. The illustrative environment 300 includes a connector builder 304, a connector player 314, a test system 316, and an expert system 318, as well as the developer UI portal 118 of FIG. 1. In some embodiments, one or more of the developer UI portal 118, the connector builder 304, the connector player 314, the test system 316, and the expert system 318 may include one or more computer-readable medium (e.g., the memory 204, the data storage device 210, and/or any other media storage device) having instructions stored thereon and one or more processors (e.g., the CPU 200) coupled with the one or more computer-readable medium and configured to execute instructions to perform the functions described herein. Additionally, the illustrative environment 300 includes a models database 302 and a library manager 306, each of which will be described in further detail below.

As described previously, the developer UI portal 118 may be embodied as any type of firmware, hardware, software, circuitry, or combination thereof capable of performing the functions described herein. Additionally, each of the connector builder 304, the connector player 314, the test system 316, and the expert system 318 may also be embodied as any type of firmware, hardware, software, circuitry, or combination thereof capable of performing the respective functions described herein.

As also described previously, the developer UI portal 118 is configured to provide an interface to a developer for generating a packaged API connector for a cloud service. To do so, the developer UI portal 118 is configured to communicate with a developer (e.g., via hyper-text transfer protocol (HTTP) requests/responses) and interface with the various components and storage medium of the environment 300.

For example, the developer UI portal 118 is configured to communicate with the developer to receive information (i.e., connector description information) usable to package an API connector developed by the developer. As described previously, the API connector is usable to generate instances of the connector which enable the interface between the cloud service broker and the cloud ISV. As such, the connector description information may include any information related to the API connector that can be used for creating an instance of the API connector. For example, the connector description information may include, but is not limited to, UI information (e.g., a title of the service, one or more icons, etc.), resource model information (e.g., service(s) provided, such as disk space, mailboxes, domains, etc.), credentials for establishing the provisioning channel, service plan information (e.g., billing rules for the broker/provider), resource information. The connector description information may be stored in the models database 302.

It should be appreciated that the developer may modify any portion of the connector description information (e.g., as may be stored in the models database 302) via the developer UI portal 118. To do so, the developer UI portal 118 is configured to provide one or more visual interfaces usable by the developer to generate a model for the connector and/or publish the connector (e.g., via the connector builder 304), run one or more tests on a test system against the developed connector (e.g., via the connector player 314 and the test system 316), and verify the connector against one or more compatibility rules (e.g., via the expert system 318) to ensure backward compatibility for upgrades/changes made to a connector.

The models database 302 is configured to store a model for each connector. The model may include any information usable to define or otherwise package the connector, such as UI labels (e.g., name, description, etc.), visual materials (e.g., icons, screenshots, styles, etc.), UI extensions (e.g., descriptions how to plug UI elements into existing applications), definitions of business objects supported by the connector (e.g., user, mailbox, spam filtering rule, etc.). It should be appreciated that, in some embodiments, at least a portion of the UI extensions may be defined as HTML pages, and include relevant JavaScript, CSS, images, etc., as well as a description for plugging the UI elements into the UI structure for each applicable page. Additionally, the model information may include, for every object supported by the connector, one or more properties (e.g., type, description, label, default value, etc.), one or more relations (i.e., how the object(s) are connected with other object(s) of the service domain model and the cardinality of the relation(s)), and/or usage/limit mapping (e.g., how usage/limits are mapped to sellable resources and plans). It should be appreciated that, in some embodiments, the models database may maintain multiple versions of the same connector and/or multiple connectors. Accordingly, it should be further appreciated that, in such embodiments in which multiple versions are maintained, the difference between versions (i.e., the changes) may be determined automatically (e.g., via a comparison of certain model information).

The connector builder 304 is configured to generate a schema file for all business objects associated with a connector. To do so, the connector builder 304 is configured to analyze metadata (e.g., connector description information) of the connector to identify the business objects and generate the scheme file. Additionally, the connector builder 304 is configured to generate a set of upgrade instructions in such embodiments in which the connector is not the first version of the connector (i.e., the connector being packaged is an upgrade or otherwise includes changes to a previously packaged connector for the same service). The upgrade instructions may include any model changes that can be tracked and applied to an upgraded version of the connector, such as changes to metadata of the connector, adding new properties in scope of type or assignment of a default value, removing properties, changing property names/types, adding services (e.g., a new object in the application domain model), adding new relations to/between objects of other connector or of the application domain model, renaming relations, changing relation cardinality or options, changing type required by relation, changing property access rules, changing relation access and/or assignment rules, splitting relations into more than one relations according to rules, etc.

The connector builder 304 is further configured to assemble the aforementioned generated schema and upgrade instructions, if applicable, along with source code of the connector, and frontend templates into a connector package. Furthermore, the connector builder 304 is configured to upload the assembled connector package to the available services database 110 of the marketplace computing device 102 that includes a catalogue of connectors (i.e., available services).

The library manager 306 is configured to manage the flow of data between the illustrative databases, which illustratively include a compatibility rules database 308, a connector skeleton database 310, and a frontend templates database 312. To do so, the library manager 306 is configured to perform read and write operations on each of the databases, as well as any other operations that may need to be performed on the data (e.g., standardizing the data, normalizing the data, enhancing the data, etc.).

The compatibility rules database 308 is configured to store rules for versioning management (i.e., compatibility rules). In other words, the compatibility rules ensure backwards compatibility between versions. For example, the compatibility rules do not allow a change to be made to the type of resources being sold, as backwards compatibility would be broken; however, the compatibility rules allow for expanding the configuration of that type of resources or additional types of resources to be sold. As such, the compatibility rules provide for the capability to allow for automatic upgrades to be performed, as the proposed upgrade can be tested against the compatibility rules (e.g., by the connector builder 304). It should be appreciated that there may be several sets of such rules. For example, a minor upgrade may maintain full backward compatibility, while a major upgrade may maintain limited backward compatibility.

The connector skeleton database 310 is configured to store code prepared according to model and best practices for connector development. As such, the stored code may be used as a starting framework for the development of the backend for a connector. It should be appreciated that the code may be customized depending on the model defined by the developer.

The frontend templates database 312 is configured to store user-interfaces for known scenarios (e.g., creation of a new customer/account, buying a subscription for a customer, disabling a subscription, terminating a subscription, etc.). Accordingly, when a developer enables a known scenario, UI code relevant to that scenario can be added to a UI component of the connector from the frontend templates database 312.

It should be appreciated that, in some embodiments, the data stored in the respective databases as described herein may not be mutually exclusive. In other words, certain data described herein as being stored in one database may additionally or alternatively be stored in another database described herein, or another database altogether. It should be further appreciated that, in some embodiments, the data may be stored in a single database, a distributed database, or an alternative database arrangement.

The connector player 314 is configured to run test scenarios of the connector against a test system (e.g., the test system 316). Such scenarios may include deploying the connector, creating connector instances, configuring service templates and plans, testing subscription/user creation, requesting usage for counter resources, etc. Accordingly, the test system 316 is configured to provide resources usable to test various scenarios of a connector. It should be appreciated that the resources may be physical and/or virtual resources.

The expert system 318 is configured to analyze potential pairing services and suggest one or more identified services as candidates to be paired with the service associated with the connector. To do so, the expert system 318 is configured to identify information associated with the connector (e.g., a service type, description, etc.) and compare the identified information with corresponding information of other services that are typically paired. In an illustrative example, the expert system 318 may suggest to pair an anti-spam service based on the results of analysis performed on a connector for an electronic mail service. It should be appreciated that any relations may change the associated connector model.

As described previously, the developer portal computing device 116 may be comprised of one or more computing devices 134. Accordingly, while the developer UI portal 118, the models database 302, the library manager 306, the connector builder 304, the connector player 314, the test system 316, and the expert system 318 are illustratively shown as residing on a single computing device 134 (i.e., the developer portal computing device 116), it should be appreciated that, in some embodiments, one or more components may be located on different computing devices 134, together comprising the developer portal computing device 116.

Referring now to FIGS. 4A-4D, an illustrative method 400 is provided for creating and distributing integration connectors in cloud service brokerage systems that may be performed by the developer portal computing device 116, or more particularly by one or more of the components of the developer portal computing device 116 (e.g., the developer UI portal 118, the connector builder 304, etc.). The method 400 begins in block 402, in which the developer portal computing device 116 determines whether to create a connector object. If so, the method 400 advances to block 404 in which the developer portal computing device 116 selects a relevant connector skeleton (e.g., from the connector skeleton database 310 of FIG. 3). As described previously, the connector skeleton may be in the form of code usable as a starting framework for the development of the backend for a connector.

In block 406, the developer portal computing device 116 generates a unique connector model identifier. In block 408, the developer portal computing device 116 requests (e.g., via the UI developer portal 118) connector description information for a connector model from a connector developer. In an illustrative example, in block 410, the developer portal computing device 116 requests UI information (e.g., a service title, a service type, an icons, etc.) and one or more provider instructions. As described previously, the connector description information may include any information related to the API connector that can be used for instantiating an instance of the API connector, such as resource model information (e.g., service(s) provided, such as disk space, mailboxes, domains, etc.), credentials for establishing the provisioning channel, service plan information (e.g., billing rules for the broker/provider), resource information.

In block 412, the developer portal computing device 116 determines whether the requested information has been received (e.g., via the UI developer portal 118). If so, the method 400 advances to block 414, in which the developer portal computing device 116 stores the received information (e.g., in the models database 302 of FIG. 3). In block 416, the developer portal computing device 116 notifies an expert system (e.g., the expert 318 system of FIG. 3) to perform a version analysis (see, e.g., the method 500 of FIG. 5). In other words, the developer portal computing device 116 notifies the expert system to analyze existing connectors (e.g., in the available services database 110 of the connector hub 106 of FIG. 1) for possible connectors which are previous versions of the connector object. In block 418, the developer portal computing device 116 determines whether the version analysis has been completed, such as may be determined upon receiving an indication from the expert system tasked with performing the version analysis.

Figure 4A:
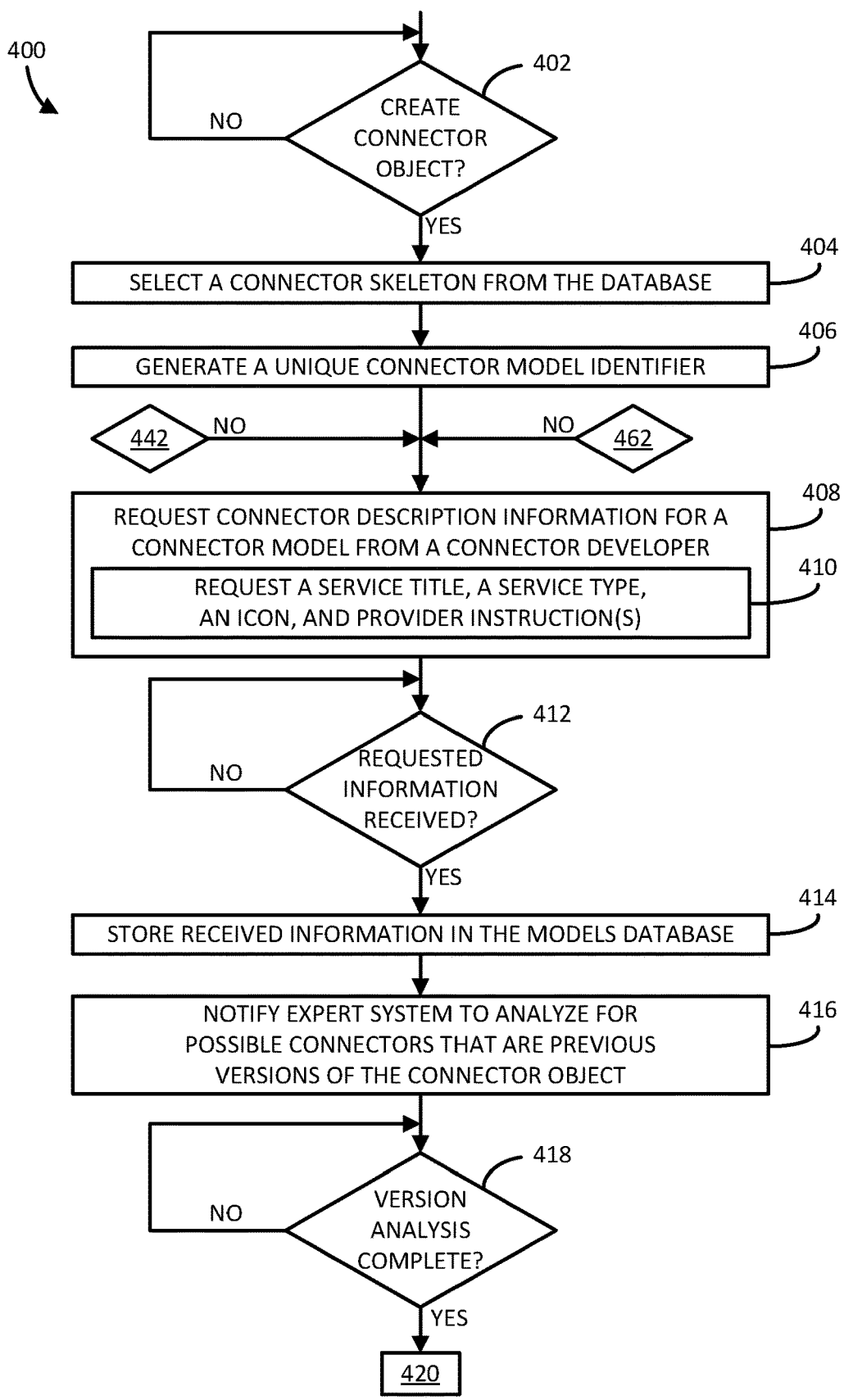
FIGS. 4A-4D are a schematic flow diagram of an illustrative method for creating and distributing connectors in cloud service brokerage systems that may be performed by the developer portal computing device of FIG. 1.
Figure 4B:
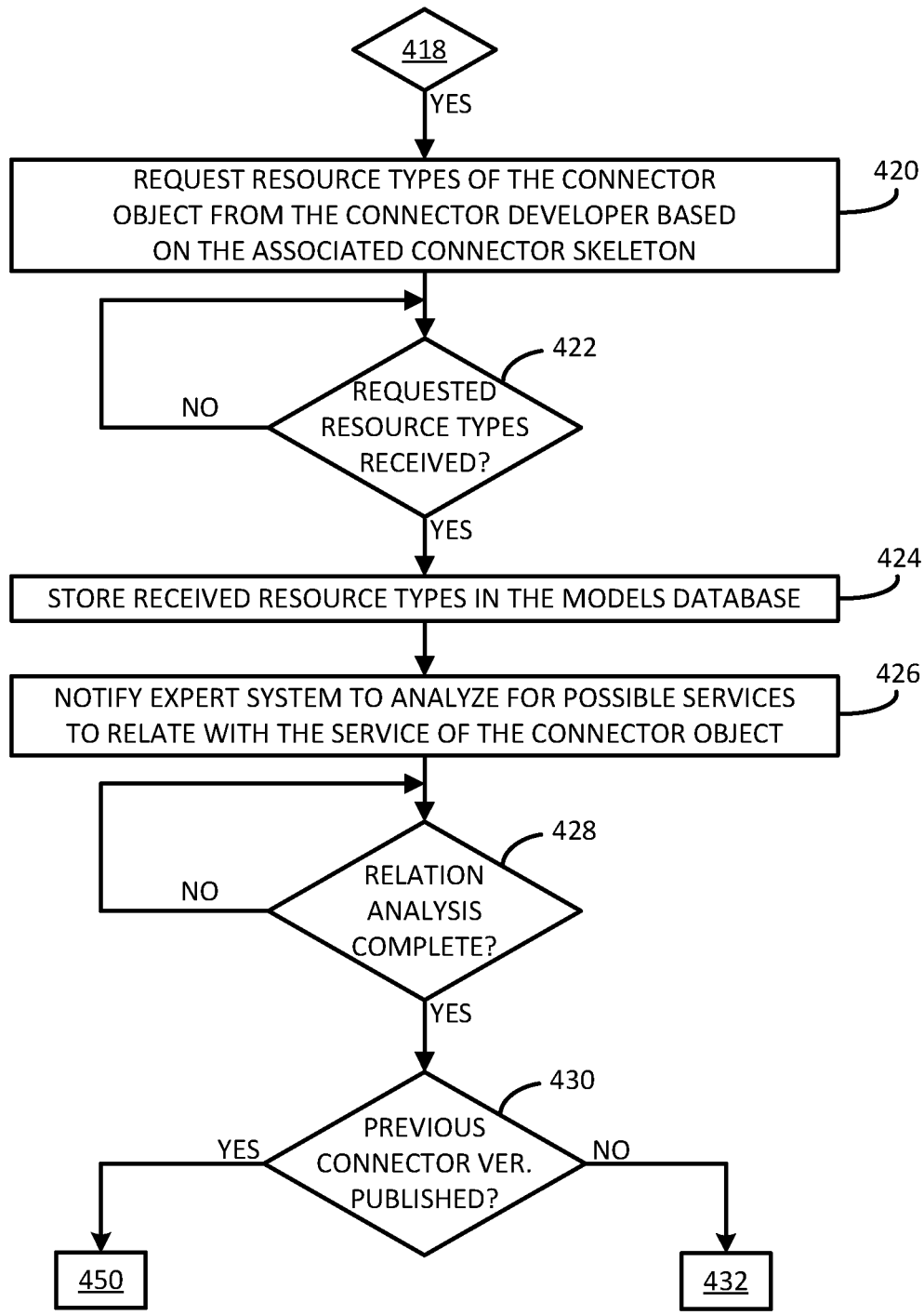

If the developer portal computing device 116 determines the version analysis has been completed, the method 400 advances to block 420, shown in FIG. 4B. In block 420, the developer portal computing device 116 requests to receive resource types of the connector object from the connector developer (e.g., via the UI developer portal 118) based on the associated connector skeleton selected by the connector developer in block 404. In block 422, the developer portal computing device 116 determines whether the requested resource types have been received. If so, the method 400 advances to block 424, in which the developer portal computing device 116 stores the received resource types in the models database (e.g., in the models database 302 of FIG. 3).

Figure 4C:
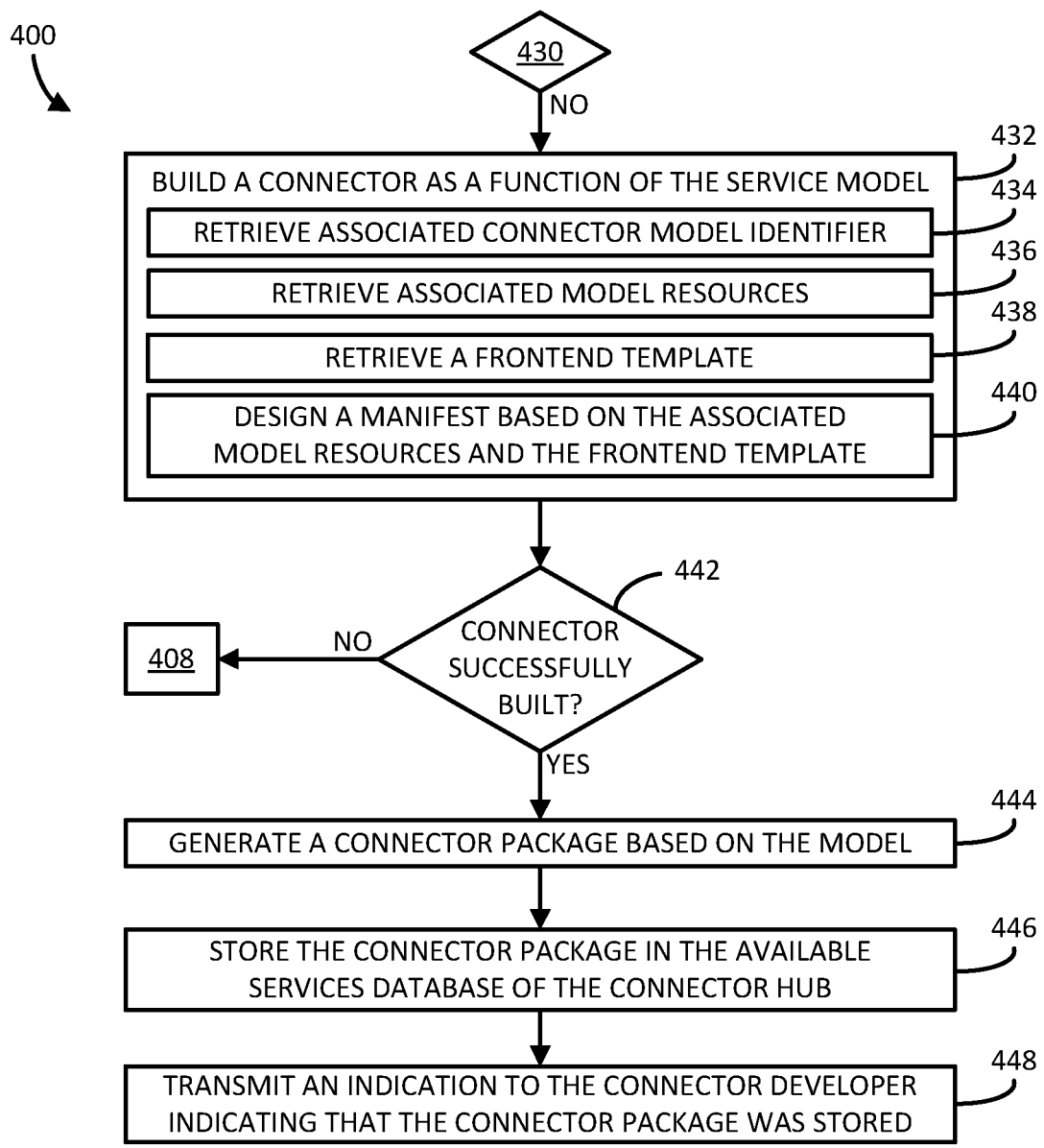
Figure 6:
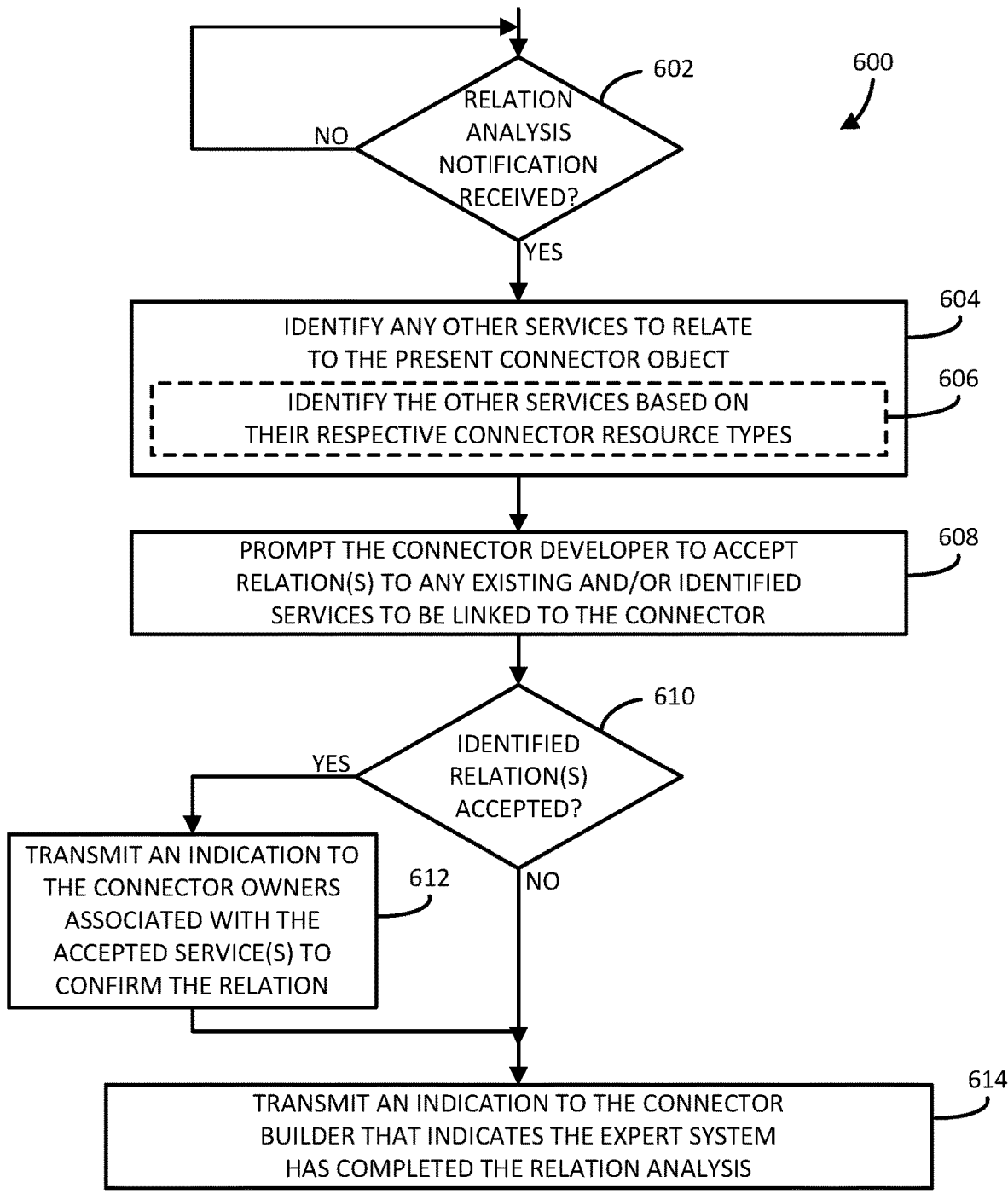
FIG. 6 is a schematic flow diagram of another illustrative method for performing a pairing analysis on connector objects that may be performed by the developer portal computing device of FIG. 1.

In block 426, the developer portal computing device 116 notifies the expert system (e.g., the expert system 318) to perform a relation analysis (see, e.g., the method 600 of FIG. 6). In other words, the developer portal computing device 116 notifies the expert system to analyze the connector object being created for possible services to relate with the service of the connector object. In block 428, the developer portal computing device 116 determines whether the relation analysis has been completed. If so, the method 400 branches to block 430, in which the developer portal computing device 116 determines, based on received information from the expert system 318 in block 418, whether the connector object has one or more corresponding version(s) of the connector object that have been published previously. If so, the method 400 branches to block 450, which is shown in FIG. 4D and described below; otherwise, the method 400 branches to block 432, which is shown in FIG. 4C.

In block 432, the developer portal computing device 116 builds a connector as a function of the service model. To do so, in block 434, the developer portal computing device 116 retrieves the associated connector model identifier generated in block 406. Additionally, in block 436, the developer portal computing device 116 retrieves the associated model resources. Further, in block 438, the developer portal computing device 116 retrieves a frontend template (e.g., user-interfaces for known scenarios). Further still, in block 440, the developer portal computing device 116 designs a manifest based on the retrieved associated model resources and frontend template.

In block 442, the developer portal computing device 116 determines whether the connector was successfully built. If not, the method 400 returns to block 408 to request additional and/or alternative connector description information; otherwise, the method 400 advances to block 444. In block 444, the developer portal computing device 116 generates a connector package based on the model. In block 446, the developer portal computing device 116 stores the connector package (e.g., in the available services database 110 of the connector hub 106 of FIG. 1). In block 448, the developer portal computing device 116 transmits an indication to the connector developer indicating that the connector package was stored.

Figure 4D:
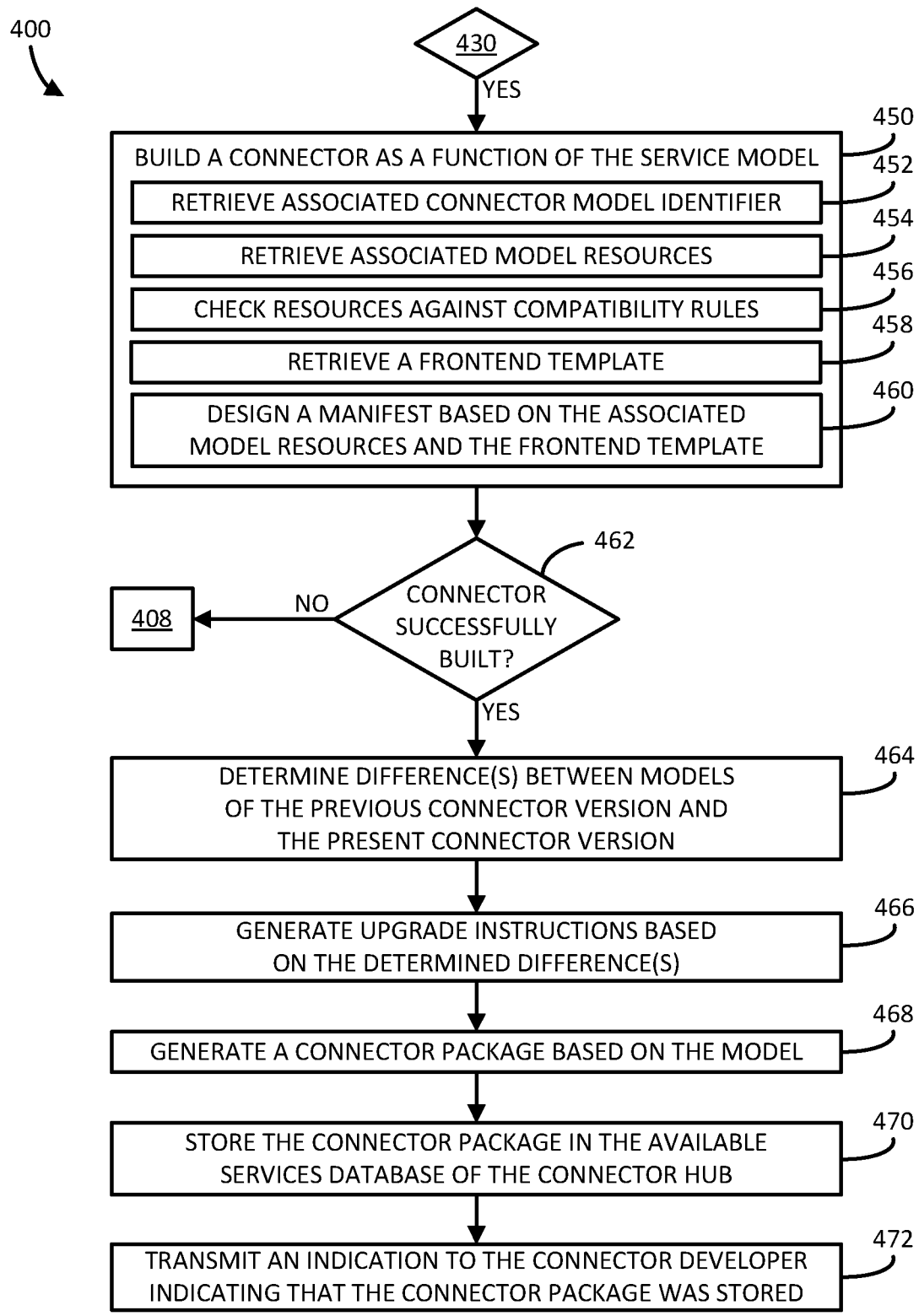

As described previously, in block 430 (shown in FIG. 4B), if the developer portal computing device 116 determines that the connector object has any previously published versions, the method 400 branches to block 450, which is shown in FIG. 4D. In block 450, the developer portal computing device 116 builds a connector as a function of the service model. To do so, in block 452, the developer portal computing device 116 retrieves the associated connector model identifier generated in block 406. Additionally, in block 454, the developer portal computing device 116 retrieves the associated model resources. Further, in block 456, the developer portal computing device 116 checks resources against any applicable compatibility rules to ensure backward compatibility for upgrades/changes made to a connector. As described previously, the compatibility rules provide for the capability to allow for automatic upgrades to be performed, as the proposed upgrade can be tested against the compatibility rules (e.g., as may be stored in the compatibility rules database 308). Further still, in block 458, the developer portal computing device 116 retrieves a frontend template (e.g., user-interfaces for known scenarios). Yet further still, in block 460, the developer portal computing device 116 designs a manifest based on the retrieved associated model resources and frontend template.

In block 462, the developer portal computing device 116 determines whether the connector was successfully built (e.g., if the resources violate any compatibility rules). If not, the method 400 returns to block 408 to request additional and/or alternative connector description information; otherwise, the method 400 advances to block 464. In block 464, the developer portal computing device 116 determines any differences between models of the previous connector version and the present connector version. In block 466, the developer portal computing device 116 generates one or more upgrade instructions based on the differences determined in block 464. As described previously, the upgrade instructions may include any model changes that can be tracked and applied to an upgraded version of the connector In block 468, the developer portal computing device 116 generates a connector package based on the model and the upgrade instructions. In block 470, the developer portal computing device 116 stores the connector package (e.g., in the available services database 110 of the connector hub 106 of FIG. 1). In block 472, the developer portal computing device 116 transmits an indication to the connector developer indicating that the connector package was stored.

Figure 5:
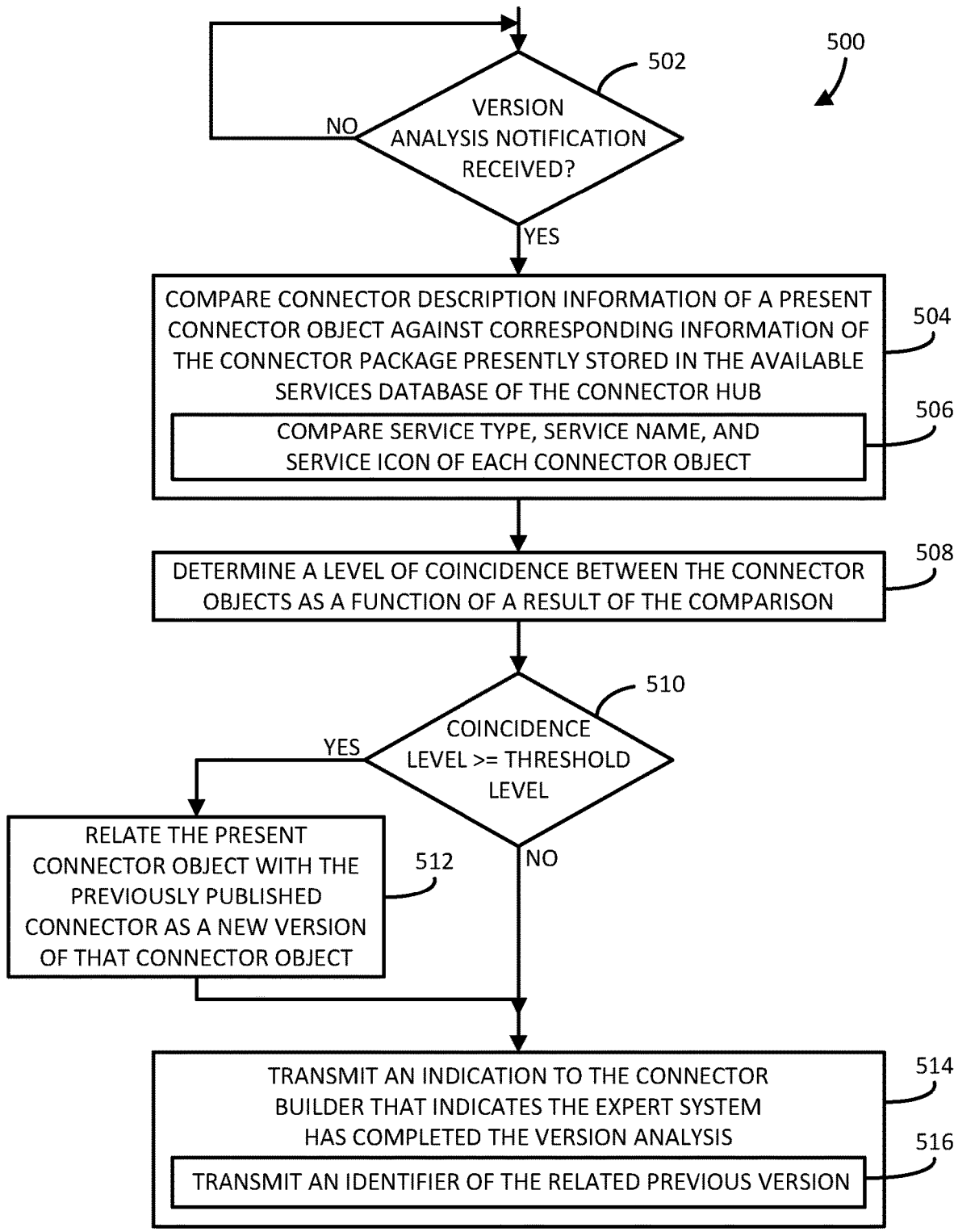
FIG. 5 is a schematic flow diagram of an illustrative method for performing a version analysis on connector objects that may be performed by the developer portal computing device of FIG. 1.

Referring now to FIG. 5, an illustrative method 500 is provided for performing a version analysis on connector objects that may be performed by the developer portal computing device 116, or more particularly by the expert system 318 of the developer portal computing device 116. The method 500 begins in block 502, in which the expert system 318 determines whether a version analysis notification was received (e.g., from a developer via the developer UI portal 118 of FIGS. 1 and 3).

In block 504, the expert system 318 compares connector description information of the present connector object being created against corresponding information of the connector package(s) presently stored in the available services database 110 of the connector hub 106 of FIG. 1, such as may be determined from the associated model (e.g., resource model information stored in the models database 302 of FIG. 3). As described previously, the connector description information may include any information related to the API connector that can be used for instantiating an instance of the API connector. In an illustrative example, in block 506, the expert system 318 compares a service type, a service name, and a service icon of each connector object.

In block 508, the expert system 318 determines a level of coincidence between the connector objects as a function of a result of the comparison performed in block 504. In block 510, the expert system 318 determines whether the coincidence level determined in block 508 is greater than or equal to a coincidence level threshold. The coincidence level may be any numerical value (e.g., amount, quantity, counter value, percentage, etc.) usable to convey a level of coincidence between information (e.g., the service type, the service name, the service icon, etc.) of each connector object. Accordingly, the coincidence level threshold may be defined as any corresponding amount usable to compare against the coincidence level to determine whether the coincidence level is high enough such that it can be reasonably determined that the connector objects are associated (i.e., one is a previous version of the other).

If the expert system 318 determines the coincidence level is greater than or equal to the coincidence level threshold, the method 500 branches to block 512 before advancing to block 514. In block 512, the expert system 318 relates the present connector object with the previously published connector as a new version of that connector object. If the expert system 318 determines the coincidence level is less than the coincidence level threshold, the method 500 branches to block 514, in which the expert system 318 transmits an indication to the connector builder (e.g., the connector builder 304 of FIG. 3) that indicates the expert system has completed the version analysis. In block 516, the expert system 318 transmits an identifier of the previous version of the connector object, as may be applicable (i.e., if the relation occurred in block 512).

Referring now to FIG. 6, an illustrative method 600 is provided for performing a pairing analysis on connector objects that may be performed by the developer portal computing device 116, or more particularly by the expert system 318 of the developer portal computing device 116. The method 600 begins in block 602, in which the expert system 318 determines whether a relation analysis notification was received (e.g., from a developer via the developer UI portal 118 of FIGS. 1 and 3). In block 604, the expert system 318 identifies any other services that could be related to the current connector object. To do so, in block 606, the expert system 318 may identify the other services based on information their connector packages stored in the available services database 110 of the connector hub 106, such as their respective connector resource types.

In block 608, the expert system 318 prompts the connector developer to accept the identified relation(s) to any existing and/or identified services to be linked to the connector. In block 610, the expert system 318 determines whether the relation(s) were accepted. It should be appreciated that, in some embodiments, some, all, or none of the identified relation(s) may be accepted. It should be further appreciated that, in some embodiments, the developer may not be prompted to accept the relations. In other words, in such embodiments, the relations may be identified and associated automatically, such that the method 600 advances directly from block 604 to block 612. If any of the identified relations were accepted in block 610, the method 600 advances block 612 before proceeding to block 614. In block 612, the expert system 318 transmits an indication to each of the connector owners associated with the accepted service(s) to confirm the relation. Otherwise, if any of the identified relations were not accepted in block 610, the method 600 advances block 614, in which the expert system 318 transmits an indication to the connector builder (e.g., the connector builder 304 of FIG. 3) that indicates the expert system has completed the relation analysis.

Figure 7:
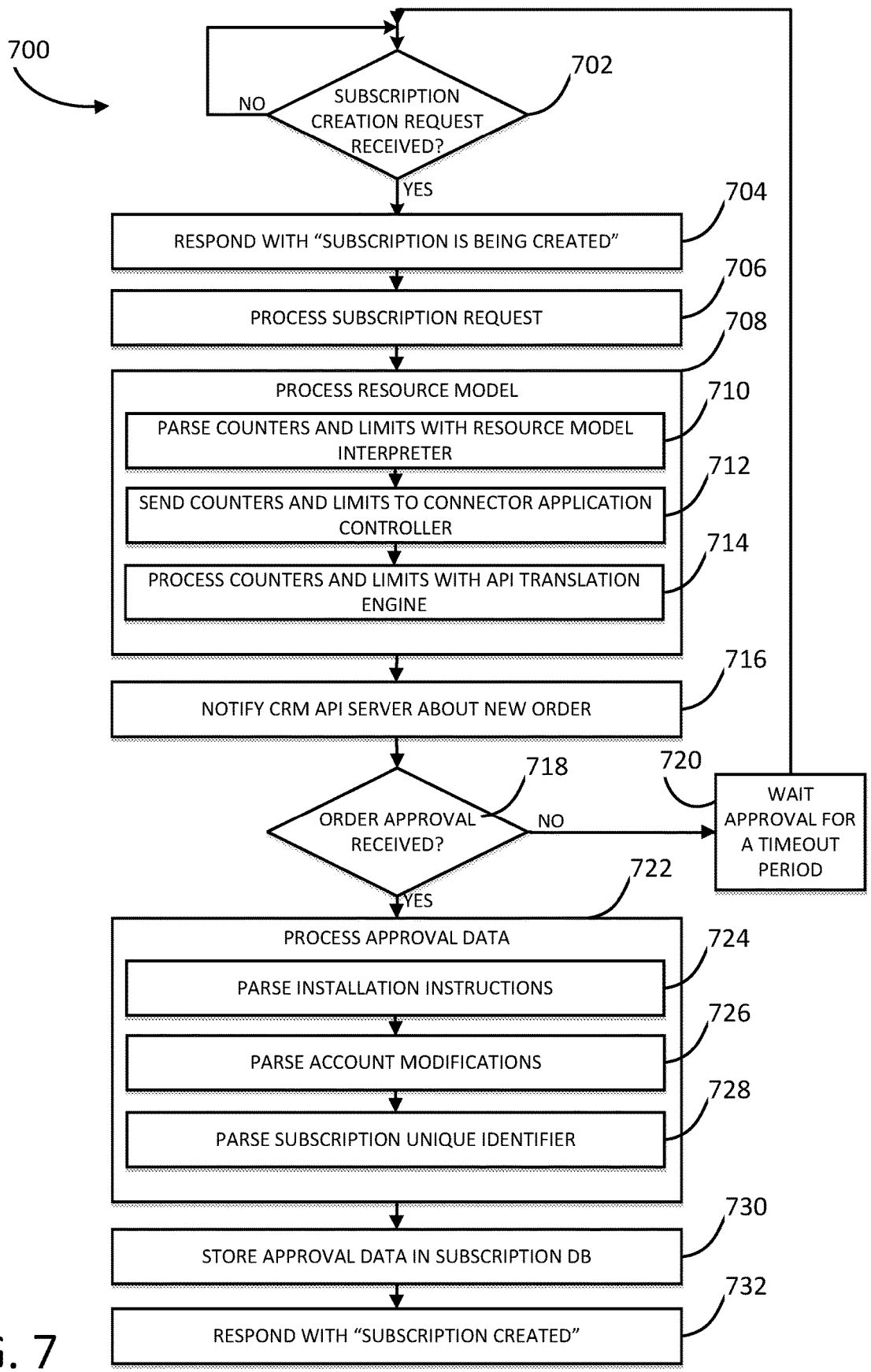
FIG. 7 is a schematic flow diagram of an illustrative embodiment of a system for integrating cloud applications into a cloud service broker platform using an automated, universal connector.

In at least one embodiment of the present disclosure, a flow diagram of an illustrative embodiment of a method 700 for integrating cloud applications into a cloud service broker platform using an automated, universal connector, is shown in FIG. 7. In block 702, the marketplace computer device 102 transmits a subscription create request to the universal connector 136, and the universal connector 136 responds that a subscription request has been received. If a subscription request has been received, the method 700 proceeds to block 704; otherwise it loops back to block 702.

In at least one embodiment of the present disclosure, the universal connector 136 responds that a subscription is being created (or processed depending on request), and proceeds to block 708 wherein its processes the resource model received. In at least one embodiment of the present disclosure, the universal controller 170 parses counters and limits with the resource model interpreter 174, at block 710. The method 700 proceeds to block 712 wherein the connector application controller 172 receives counters and limits. The method 700 then proceeds to block 714 wherein the API translation engine 178 processes the counters and limits.

In at least one embodiment of the present disclosure, the method 700 then proceeds to block 716 wherein the universal controller 170 notifies the CRM database 166 that a new order has been defined. In at least one embodiment of the present disclosure, an operator may review the order, and optionally alter the data that may be invalid, and approve or reject the order, at block 718. Upon approval, the method 700 then proceeds to block 722 wherein the approved data is processed.

In at least one embodiment of the present disclosure, the approval from block 718 requires processing. By way of example, an operator may send installation instructions through the CRM API server 138, and the universal connector device 136, as shown in FIG. 1A. It will be appreciated that this is the instruction for subscription activation. Continuing with this example, any account modifications are permed at the CRM API server 138 and maintained in the database 166 (as shown in FIG. 1B), and subsequently transmitted through universal connector 136, to cloud broker computing device 130.

In at least one embodiment of the present disclosure, the method 700 proceeds to block 730 where the approval data is stored in the subscription database 160. The method 700 then proceeds to block 730 where the API translation engine 178 translates calls from CRM API server 138 to a format that is operable by universal connector 136. It will be appreciated that the connector application controller 172 processes the approval data and stores the same in subscription database 160. In at least one embodiment of the present disclosure, the connector application controller 172 further formulates a response to send to the polling and notification engine 176, and eventually to cloud server broker computing device 130.

Figure 8:
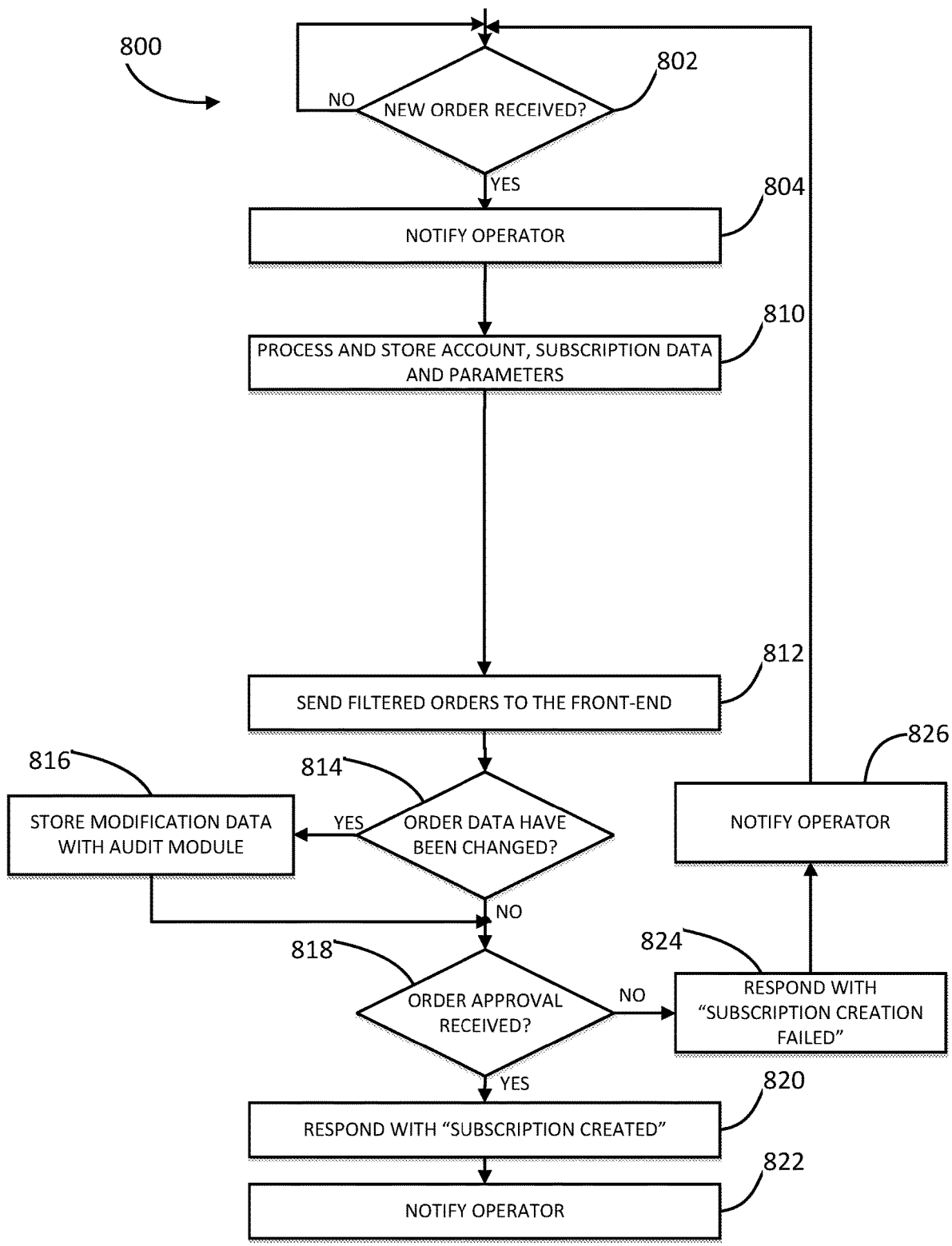
FIG. 8 is a schematic flow diagram of another illustrative embodiment of a system for integrating cloud applications into a cloud service broker platform using an automated, universal connector.

In at least one embodiment of the present disclosure, a flow diagram of an illustrative embodiment of a method 800 for integrating cloud applications into a cloud service broker platform using an automated, universal connector package, is shown in FIG. 8. In block 802, a check is performed by CRM API server 138 to verify if a new order is received. If a new order is received, the method 800 proceeds to block 804, wherein the operator is notified that the order is received. It will be appreciated that the operator may be notified by operation of the browser 164.

The method 800 proceeds to block 810. At block 810, the account, subscription data and parameters are processed. By way of example, if an account does not exist, then the account is created; if a subscription does not exist, a subscription is created. The data accompanying the creation of such an account or subscription is stored in database 166. It will be appreciated that the universal connector 136 transmit all this data (e.g. via network 128) to the database 166. The method 800 then proceeds to step 812 wherein the filtered orders are sent to the front-end (e.g. browser 164).

In block 814, the method 800 checks to see if the order data has been changed. If the data has been changed, the method 800 proceeds to step 816, wherein the order data is stored within the audit module 156. The method 800 then proceeds to block 818. Alternatively, if there is no change in data as checked at block 814, the method 800 proceeds to block 818, as well. At block 818, a check is performed to see if the order approval is received. If the operator approval is received, the method proceeds to block 820; otherwise, it proceeds to block 824.

Method 800 then proceeds to block 822, wherein the operator is notified that the subscription is created.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for integrating cloud applications into a cloud service broker (CSB) using an automated, universal connector, the method comprising:

testing at a developer portal device by a connector player, a produced connector package for a software from an independent software vendor device;

receiving at a connector hub, a connector package for a software from the independent software vendor device;

generating at the connector hub, a pair of secret keys to authenticate a secure communication channel for a subscription request for the software between the CSB and a connector instance(s) deployed by the CSB;

creating the connector instance for the connector package for integration with the CSB platform, the CSB platform further configured to provide licenses for the software;

receiving at a cloud service broker computing device via a CSB platform interface, the subscription request for the software, the subscription request comprising an activity selected from a group consisting of a creation, change and deletion;

transmitting to a universal connector device by a CSB platform controller, the subscription request;

processing, at the universal connector device, the subscription request;

notifying a customer relationship management (CRM) device, by the universal connector device, of the subscription request;

storing the subscription request in a CRM database;

obtaining approval by the universal connector device, for the subscription request;

processing, at the universal connector device, the subscription request, upon receiving a request approval; and transmitting a subscription approval result to the CSB platform, the CSB platform displaying subscription approval result to a subscriber.

2. The method of claim 1, wherein the connector package is developed on a developer portal, the developer portal being accessible by the independent software vendor device.

3. The method of claim 1, wherein the subscription request further comprises a correspondent resource model defined in the connector package.

4. The method of claim 3, wherein the subscription request is received by a connector application controller.

5. The method of claim 4, further comprising the step of processing the subscription request at a resource model interpreter.

6. The method of claim 1, wherein processing further comprises the step of processing request data with an application programming interface (API) translation engine.

7. The method of claim 1, wherein processing, at the universal connector device further comprises the step of parsing counters and limits of the resource model of the correspondent connector package.

8. The method of claim 3, wherein processing, at the universal connector device further comprises the step of parsing counters and limits of the resource model of the correspondent connector package.

9. The method of claim 6, wherein processing further comprises the step of processing counters and limits with the application programming interface (API) translation engine.

10. The method of claim 6, wherein the step of processing request data comprises the step of transforming CSB platform requests into a format operable by the CRM device, and further displaying the requests in a CRM user interface (UI).

11. The method of claim 1 further comprising the step of the automated universal connector transmitting a pending request to the CRM device, and polling an operator response from a CRM API device.

12. The method of claim 1, wherein processing approval data comprises the step of receiving and transforming installation instructions for subscription activation/change received from a CRM API server into format displayable by CSB platform UI.

13. The method of claim 1, wherein processing a CRM response further comprises the step of transforming account modifications received from a CRM API server into format displayable by a CSB platform UI.

14. The method of claim 1, wherein account modifications are stored in a subscription database operably connected to the universal connector device.

15. The method of claim 1, wherein processing a CRM response further comprises the step of parsing and matching a subscription unique identifier associated with an ISV subscription management system, the subscription unique identifier associated with a CSB platform subscription management system.

16. The method of claim 1 further comprising the step of the automated universal connector providing a response, the response selected from the group consisting of the creation, modification, and deletion.

17. The method of claim 1 further comprising storing data associated with the subscription request and response in a database of a region that fulfills requirements of the country where the CSB platform is operating.

18. The method of claim 1 further comprising an audit module operably connected with the CRM device that records operator actions in the CRM database.

19. The method of claim 18 wherein audit data is used for analyzing technical problems with the integration components.

20. The method of claim 1 wherein the CRM device further comprises a security module for authentication of universal connectors.

* * * * *